(12) United States Patent
Skinner et al.

(10) Patent No.: US 7,238,256 B2
(45) Date of Patent: Jul. 3, 2007

(54) PIPE CONSTRUCTION SYSTEM

(76) Inventors: Lee M Skinner, 132 Balgores Lane, Romford, Essex (GB) RM2 5JX; Graham F Towers, 24 High Street, Ringstead, Kettering, Northamptonshire (GB) NN14 4DA; Afay Talwar, C-43 Kirti Nagar, New Delhi (IN) 110015

( * ) Notice: Subject to any disclaimer, the term of this patent is extended or adjusted under 35 U.S.C. 154(b) by 300 days.

(21) Appl. No.: 10/416,747

(22) PCT Filed: Nov. 9, 2001

(86) PCT No.: PCT/GB01/04961

§ 371 (c)(1),
(2), (4) Date: May 12, 2003

(87) PCT Pub. No.: WO02/38998

PCT Pub. Date: May 16, 2002

(65) Prior Publication Data

US 2004/0025955 A1    Feb. 12, 2004

(30) Foreign Application Priority Data

Nov. 10, 2000    (GB) .................................. 0027521.4

(51) Int. Cl.
*F16L 9/22*    (2006.01)
*B29C 65/54*    (2006.01)

(52) U.S. Cl. ................. 156/304.2; 156/304.1; 156/304.5; 138/155; 138/157

(58) Field of Classification Search ............. 156/304.1, 156/304.2, 304.5, 157, 502; 138/155–157; 405/135
See application file for complete search history.

(56) References Cited

U.S. PATENT DOCUMENTS

| | | | | |
|---|---|---|---|---|
| 1,052,198 A | * | 2/1913 | Wyre | 138/157 |
| 1,393,329 A | * | 10/1921 | Trowbridge | 138/157 |
| 1,846,550 A | * | 2/1932 | Gottwald | 138/106 |
| 2,005,699 A | * | 6/1935 | Gottwald | 138/157 |
| 4,967,800 A | * | 11/1990 | Heilmayr et al. | 138/162 |
| 6,089,279 A | * | 7/2000 | Clarke et al. | 138/157 |

* cited by examiner

*Primary Examiner*—Mark A. Osele
(74) *Attorney, Agent, or Firm*—Renner, Kenner, Greive, Bobak, Taylor & Weber

(57) ABSTRACT

A pipe construction system which utilizes a multiplicity of arcuate pipe segments 11, 12 to form a pipe section 10 and which sections are assembled together to form a length of pipe. Each segment 11, 12 has two longitudinal edges 13 of increased radial thickness and having a groove 14 formed in the circumferential direction whereby an interlocking and sealing member 15 may be located in the aligned grooves 14 of two adjacent segments 11, 12. One end of a pipe section 10 assembled from the segments defines a socket 22 for receiving a spigot 23 defined at the other end of a like section. The spigot end of each segment has a pocket 25 formed along said edge 13 but within the thickness of the major area of the segment, which pocket 25 mates with a corresponding pocket 25 of an adjacent segment whereby sealant may be disposed in the mating pockets.

23 Claims, 3 Drawing Sheets

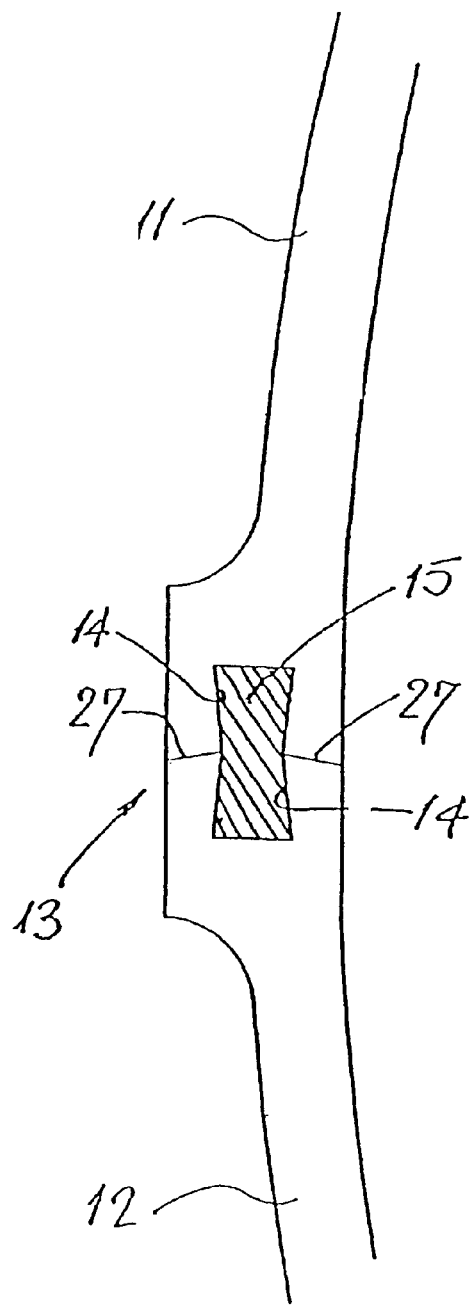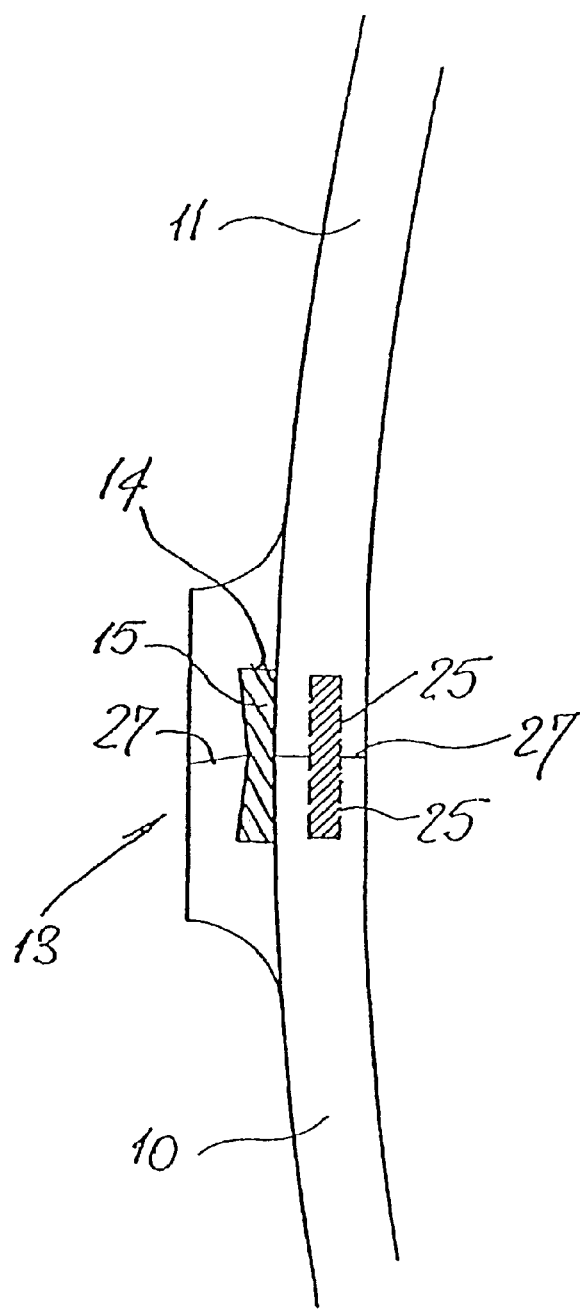

PIPE CONSTRUCTION SYSTEM

TECHNICAL FIELD

This invention relates to a pipe construction system and also to a method for constructing a pipe from a multiplicity of pipe segments. Certain aspects of this invention concern the lining of an underground sewer, using the pipe construction system.

BACKGROUND OF THE INVENTION

In the following description and explanation of this invention, reference will be made primarily to the lining of underground sewers, though it is to be understood that the pipe construction system of this invention is not limited to this application, and may be used for a very wide range of different applications. For example, the system may be used to construct an overland or underground pipe, as well as to line a wide variety of ducts, so long as the duct is sufficiently large to permit access by human operators, to effect the lining method.

Many underground sewers in major cities throughout the world were constructed more than 100 years ago. Consequently, those sewers are by now becoming very worn internally, with the brickwork or other constructional materials deteriorating in view of the nature of the liquids and gases present within the sewer. Further, due to ground movements over the years, the structural integrity of those sewers can be seriously compromised. These aspects can lead to failure within sewers, by the walls of the sewers collapsing inwardly. The consequent remedial work necessary to restore the sewer is extremely difficult and unpleasant to perform, since by the time such work is commenced, there is likely to be a large volume of sewage backed up behind a blockage caused by the failure.

It is known to provide a lining within underground ducts such as sewers, in an attempt to restore integrity to the structure. Such a lining technique may be performed before there is a catastrophic failure, by opening the sewer at a convenient point and then fitting into the sewer relatively short lengths of pipe which are connected together end-to-end. In the case of a sewer of circular cross-sectional shape, such short lengths of a pipe may be a sliding fit within the existing sewer so that no further work is required. Alternatively, the external diameter of the assembled pipe may be significantly less than the internal diameter of the sewer and then a grouting material is injected under pressure into the generally annular space between the pipe and the internal sewer wall.

Particularly in the case of relatively large sewers, it is also known to assemble a lining from short lengths of pipe which lengths themselves are assembled from segments each of part-circular shape. One widely used system employs a tongue along one axially-extending edge of a segment and a correspondingly formed groove along the other axially-extending edge of a segment whereby the segments may be assembled together with the tongue of one segment fitting into the groove of the next adjacent segment. This system has the disadvantage that the strength of the segments is much reduced in the area of the inter-fitting tongues and grooves resulting in a relatively weak joint between adjacent segments. Further, it is necessary axially to slide the last segment (or the second segment, where two semi-circular segments form the pipe section) into position and during this sliding movement, there is a relatively high risk that the tongue or one of the groove walls will be broken away from its segment.

An alternative but similar system uses butt or halved joints between adjacent lining segments, each of which joints is reinforced with an elongate internal cover plate secured over the joint. Such a system is slow and inconvenient to install, especially within the confined working space of a sewer.

A disadvantage of the above systems is that the strength and water-tight integrity of a pipe assembled as described is relatively low and so the systems are unsuitable for use other than in a grouted pipe-lining situation, where the strength may be enhanced by the surrounding grout and already existing duct or sewer. Even so, the joint could still leak and over a period of time and so deteriorate the integrity of the surrounding grout.

It has been proposed to strengthen the longitudinal joints between adjacent segments by enlarging the wall thickness in the region of the joints but in order to give a smooth internal surface to the finished pipe, all such enlargement must be effected externally of the pipe. However, this then gives rise to a problem at the ends of the pipe sections where the end of one pipe section forms a spigot which fits into a socket formed at the opposite end of the next adjacent pipe section. The enlarged wall thickness must be cut away and this leads to a very weak area of the assembled pipe, which also is highly likely to leak.

SUMMARY OF THE INVENTION

The present invention has as a principal object the provision of a pipe construction system which at least mitigates the disadvantages of the known form of segmented lining systems as discussed above, and so which may be used not only for pipe lining, but also to construct pipe lines in general, for use either above or below ground, as may be required.

Accordingly, one aspect of the present invention provides a pipe construction system comprising: a multiplicity of arcuate pipe segments a plurality of which may be assembled together to form a pipe section which defines at one end a socket for receiving a spigot defined at the other end of a like section also assembled from a plurality of said segments whereby a length of pipe may be built up from the assembled sections, each segment having two edge regions parallel to the length of the pipe section each of which edge regions is of increased radial thickness and is formed with a groove extending from the socket end up to the spigot-forming end of the segment, and at the spigot forming end of a segment there is formed a pocket along said edge but within the thickness of the major area of the segment which pocket mates with a corresponding pocket of the adjacent segment whereby a sealant may be disposed in the mating pockets.

It will be appreciated that with the pipe construction system of this invention, the formation at both axially-extending edges of each segment should be essentially the same. By providing the edge regions with an increased radial thickness, that formation may be made sufficiently strong and certainly no weaker than the strength of the major area of the segment and thus the likelihood of damage to those formations is greatly reduced, both during handling of a segment prior to assembly to form a pipe section within a sewer, and as the segment is assembled into a pipe section. Subsequent to the assembly of the segments into a pipe section, a setting or curing sealant compound may be injected into the mating grooves, thereby to effect a seal between the segments and also to lock together the segments, once the compound has set or cured, as appropriate.

Preferably, each said groove is of re-entrant form whereby the compound, once cured or set, is mechanically held in the two aligned grooves. One preferred form of groove is of dovetail cross-sectional shape, whereby the cured or set compound forms a mechanical interlocking member of a corresponding profile, in effect having two dovetail portions with the narrower ends thereof joined together. The compound also performs the sealing function as discussed above.

Curing or setting compounds can be made from a suitable resin system which may be reinforced with fibre strands and fillers, the system ensuring that a homogeneous composite structure is formed following the casting of the bonding interlocking member.

The pockets along said edges of each segment must open through the respective edge itself, in order that the pocket may mate with the pocket of the next adjacent segment to be assembled thereto. In the event that each such pocket also opens through the end face of the segment, the sealant may be injected into the mating pockets through the end face openings thereof. Alternatively, where each pocket is closed except for its opening through the axial edge of the segment, sealant may be injected into the mating pockets by drilling a hole into the mating pockets either from within the assembled pipe section or from outside (depending upon the intended use of the assembled pipe) and then the sealant injected through that drilled hole.

Each pocket preferably extends in the axial direction either from the adjacent end face of the segment or a position closely spaced therefrom, towards the other end of the segment for a sufficient distance such that the pocket terminates in the general region of the increased thickness part of the segment. The sealant does not need to have a high strength since the encircling part of the socket of the next adjacent pipe section will confer sufficient strength on the assembly. Thus, the sealant may be in the form of a conventional mastic.

In one possible system of this invention, the groove on each axially extending edge of a segment is defined by a pre-formed component bonded to the respective edge of a segment during the manufacture thereof. Such a pre-formed component may comprise a plastics material moulding, reinforced as appropriate with fibres or the like extending along the length of the component. The major part of each segment may also comprise a fibre-reinforced plastics material moulding such as of glass-reinforced plastics material. In an alternative construction, the major part of each segment has inner and outer skins each of a glass reinforced plastics material and a filled plastics material (such as a sand-filled plastics resin) being disposed between the skins.

In order to enhance the integrity of the longitudinal joint between two segments, a reinforcing strip may be laid over the joint, either externally, internally, or both externally and internally, at the time of assembling the segments together. Conveniently, such a strip is secured to one segment to run along but project from the longitudinal edge of the segment, before assembly of that segment to another. Then, when assembled to the other segment, the strip is also secured to the other segment, to cover the joint. The strip could be clamped in place for example using mechanical fasteners such as screws, perhaps with a clamping bar, or could be bonded using a suitable adhesive.

The reinforcing strip may be of a fibre-reinforced plastics material, and is advantageously fitted before the casting of the interlocking member. In this case, the strip may ensure that during the interlocking member casting step the sealant material is contained mostly within the interlocking grooves, and so does not escape from these grooves to any substantial extent. Also, following completion, the strip will add further strength and reinforcement to the longitudinal joint.

During assembly of the pipe from the sections, a suitable mastic, other sealant or a gasket may be applied to the complete socket before the next section to be assembled is fitted thereto, again to confer water-tightness to the completed pipe.

According to a second aspect of this invention, there is provided a method of constructing a pipe from a multiplicity of arcuate pipe segments a plurality of which may be assembled together to form a pipe section which defines at one end a socket for receiving a spigot defined at the other end of a like section also assembled from a plurality of the segments whereby a length of the pipe may be built up from the assembled sections, each segment having two edge regions parallel to the length of the pipe section each of which edge regions is of increased radial thickness and is formed with a groove extending from the socket end up to the spigot-forming end of the segment; and at the spigot forming end of a segment there is formed a pocket along said edge but within the thickness of the major area of the segment which pocket mates with a corresponding pocket of the adjacent segment; in which method:

a pipe section is assembled from a plurality of the segments by aligning said grooves along adjacent segment edges;

a setting or curing sealant compound is injected into each pair of aligned grooves and is allowed to set or cure to provide a bonding interlocking member;

a sealing agent is furnished in the mating pockets at the spigot end of the section;

a further section is assembled in a like manner;

sealant is disposed at least one of internally around the socket of one section or externally around the spigot of the other section; and the socket of one section and the spigot of the other section are interengaged.

According to a further but closely related method of constructing a pipe from a multiplicity of arcuate pipe segments a plurality of which may be assembled together to form a pipe section which defines at one end a socket for receiving a spigot defined at the other end of a like section also assembled from a plurality of the segments whereby a length of the pipe may be built up from the assembled sections, each segment having two edge regions parallel to the length of the pipe section each of which edge regions is of increased radial thickness and is formed with a groove extending from the socket end up to the spigot-forming end of the segment; and at the spigot forming end of a segment there is formed a pocket along said edge but within the thickness of the major area of the segment which pocket mates with a corresponding pocket of the adjacent segment; in which method:

a pipe section is assembled from a plurality of the segments by aligning said grooves along adjacent segment edges;

a setting or curing sealant compound is injected into each pair of aligned grooves, and is allowed to set or cure to provide a bonding interlocking member;

a sealing agent is furnished in the mating pockets at the spigot end of the section;

sealant is disposed either internally around the socket of the section or externally around the spigot thereof;

the segments of a further section are fitted into the socket or around the spigot of the already assembled section, to assemble a further section in a like manner but coupled to the already assembled section; and then a setting or curing sealant compound is injected into each pair of aligned grooves of the further section, and is allowed to set or cure; and a sealing agent is furnished in the mating pockets at the spigot end of the section.

According to yet another aspect of this invention, there is provided a method of lining an existing closed duct comprising effecting within that existing closed duct a pipe construction method of this invention as described above so as to build up the pipe in situ in the duct but with clearance between the outer wall of the pipe and the inner wall of the duct, and then filling that clearance with a grouting material.

BRIEF DESCRIPTION OF THE DRAWINGS

By way of example only, one specific embodiment of a pipe construction system of this invention will now be described in detail, reference being made to accompanying drawings, in which:-

FIGS. 3 and 4 are detailed cross-sections on an enlarged scale, through the pipe section of FIG. 1, taken on lines II—II and III—III marked on that Figure.

DETAILED DESCRIPTION OF EMBODIMENTS OF THE INVENTION

Figure 1:
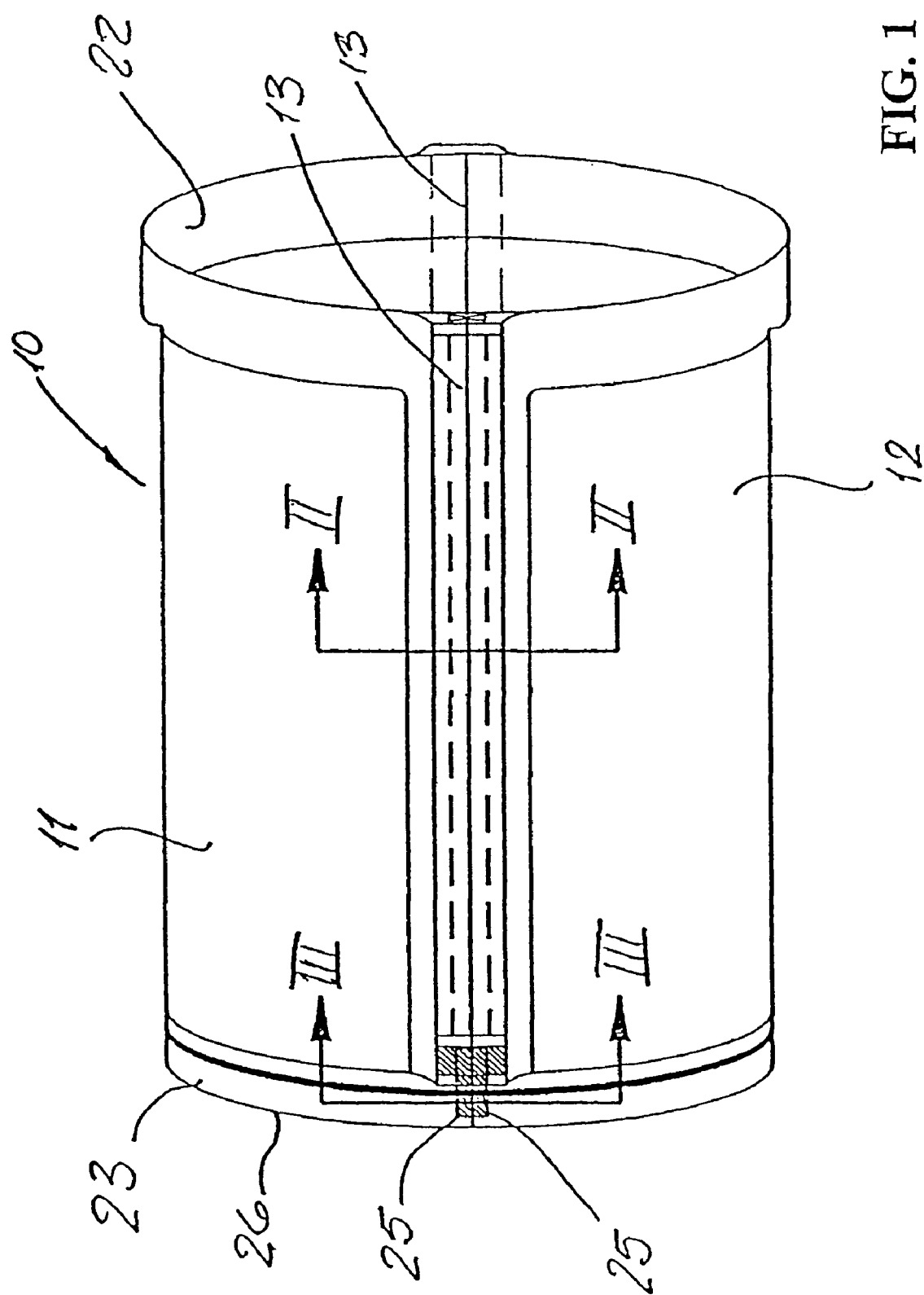
FIG. 1 is a diagrammatic side view of a section of a pipe made up from a pipe construction system of this invention, using two semi-circular segments to make up the section.

The embodiment of pipe construction system shown in the drawings is intended for lining an already existing underground sewer having a typical diameter in the range of 800 mm to perhaps 2500 mm or more. Though a circular pipe is shown, for use with a sewer of circular cross-sectional shape, the system may be manufactured to have other cross-sectional shapes to suit a sewer being lined—for example, many sewers are of egg-shaped cross-section and the segments making up each section of the pipe may be suitably profiled so that the assembled section has a corresponding cross-section.

Figure 2:
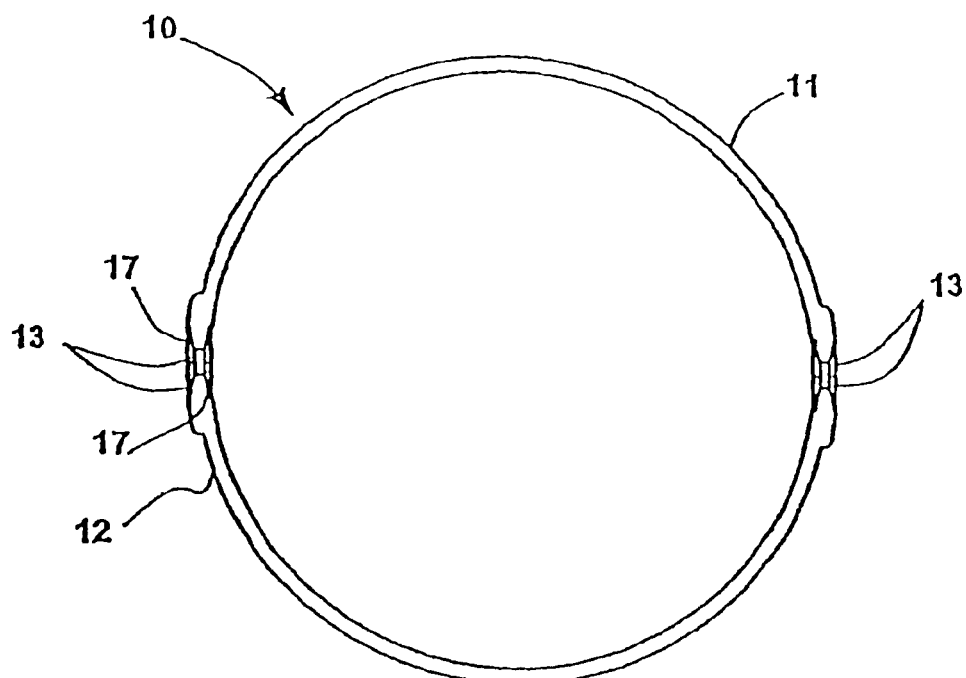
FIG. 2 is a cross-section through the pipe of FIG. 1.
Figure 5:
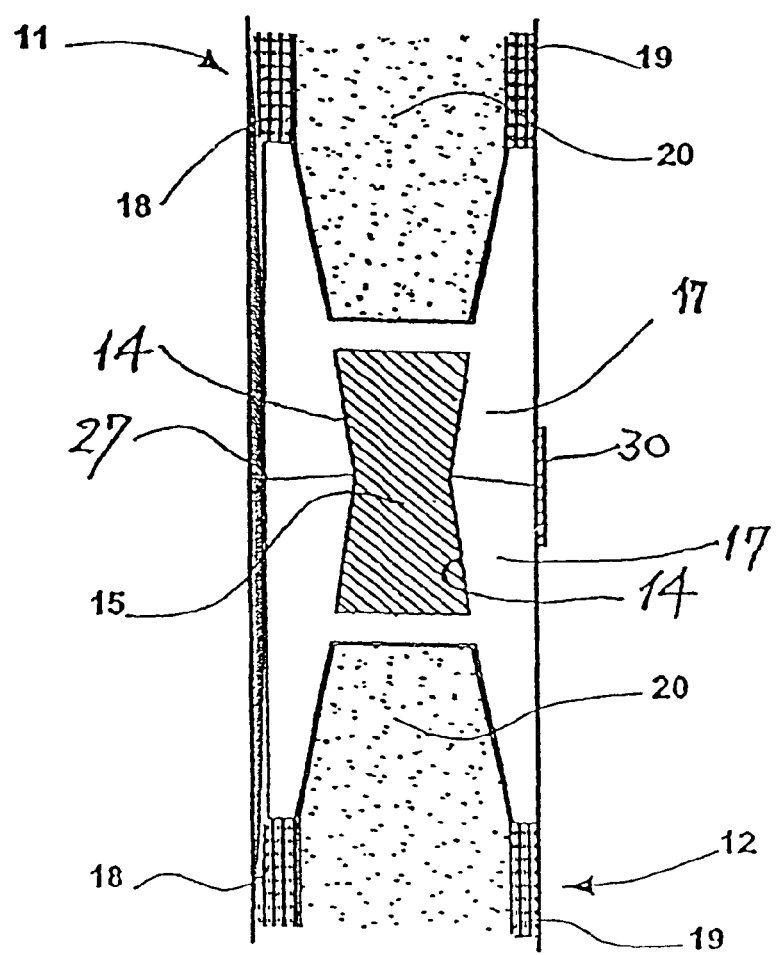
FIG. 5 is a further cross-section through the joint between adjacent long edges of two segments, showing additional details.

In FIGS. 1 and 2, the section 10 of a pipe is shown assembled from two segments 11, 12, each of semi-circular cross-sectional shape, whereby the assembled section is of circular cross-section. Each longitudinally-extending edge 13 of each segment has an enlarged thickness and defines a groove 14 of dovetail cross-sectional shape. The aligned adjacent edges 13 of the segments are connected together by means of an interlock member 15 cast in-situ in the grooves, by injecting into those grooves a setting or curing sealant component such as an epoxy resin compound. The interlock member thus has a double dovetail form, with the narrower ends of the two dovetails joined together, as shown in FIGS. 3 and 5.

Each groove 14 is defined by a pre-formed component 17, provided along the respective longitudinal edge 13 of each segment 11, 12, during the manufacture of that segment. The component 17 may, for example, be made from a glass fibre reinforced plastics material. Then, the major part of each segment may be moulded to two components 17, that major part being made up from inner and outer glass fibre reinforced plastics skins 18, 19, with a core 20 of a resin/aggregate mix. The two skins may use unidirectional E-glass fibre stitch-bonded to chopped strand mat embedded in a polyester resin and arranged so as to give the maximum hoop-strength to the finished segment.

As shown in FIG. 1, one end of each segment 11, 12 is profiled to provide a part of a socket 22 so that when the two segments are assembled, a complete socket is formed around one end of the section. The internal diameter of that socket should be slightly greater than the outer diameter of the section, ignoring the region of increased thickness along the long edges 13. At the other end of the segment, the region of increased thickness is cut away, so that the outer surface of the completed section is circular, as indicated at 23, to form a spigot which may be received in a socket of the next adjacent pipe section, during assembly.

Within the spigot region of each segment, and opening into both long edges of the segment are two pockets 25. As shown in FIG. 1, those pockets extend from the radial end face 26 at the spigot along the length of the segment and slightly overlap the region of increased thickness. Thus, when the two segments are connected together as shown in FIG. 1, the respective pairs of pockets 25 mate to provide a single pocket within the thickness of the adjoining segments. This single pocket is, during assembly, filled with a mastic sealant, in order to impart water-tightness to this region of the assembled pipe section.

The pipe is assembled in a sewer to form an internal lining by carrying the segments along a sewer from an access point and then maneuvering into position the segments, two at a time to form complete lining sections. Each section is completed by injecting a setting or curing sealant compound into the aligned grooves 14 of adjacent edges 13 to cast in-situ the interlock member 15 to complete a joint between those edges. Conveniently, the injection is achieved by vacuum drawing the compound along the length of the aligned grooves, for example by connecting a vacuum pump at one end of those grooves and injecting the compound from the other end. During this process, the compound also tends to flow between the adjoining edges 27 (FIG. 3) thereby to give a very strong and water-tight joint.

Mastic is injected into the mating pockets 25 from the radial end face 26, to complete the seal between the segments, in this region. Once completed, the assembled section is pushed axially fully to engage the spigot portion 23 with the socket 22 of a previously assembled section. A sealant, sealing member or a gasket may be provided within the socket 22 following the completion of a section, so that on pressing the reduced diameter portion of the next section into the socket, a water-tight seal between the two pipe sections is formed.

Finally, a grouting material such as a cement-based grout is injected into the space between the internal wall of the existing sewer and the external surface of the assembled section, so integrating the section with the existing sewer. Preferably, the section is approximately centred within the sewer. This may be achieved by wedging the section as appropriate during assembly.

An alternative assembly technique may be appropriate for the construction of a sewer lining from pipe sections each having only two segments, as shown in the drawings. Following the completion of one pipe section, with the socket end exposed for the connection thereto of the next section, a suitable mastic or gasket is applied around the internal surface of that socket. Then, a pipe segment is fitted into that socket, whereafter the second pipe segment (which completes the next pipe section) is also fitted into that socket with its edges in alignment with the already positioned segment. To permit the setting or curing sealant compound to be injected into the grooves, holes may be drilled into the grooves from the end of the pipe section adjacent the socket of the previously assembled section, the compound then being injected into those holes whilst a vacuum is drawn from the exposed other ends of the grooves. Mastic may be injected into the mating pockets at the spigot end, which pockets lie mostly within the confines of the socket of the previously assembled pipe section, by drilling holes into the pockets from within the pipe section and injecting the mastic through those holes.

FIG. 5 is a cross-section through the enlarged thickness longitudinal joint, including the cast in-situ interlocking member 15. Also shown in this figure is an optional reinforcing strip 30 which overlaps the longitudinal joint, externally of the two segments. This strip is made of a fibre-reinforced plastics sheet material and is bonded initially to one segment by a suitable adhesive so as to project from the longitudinal edge thereof. Then, during assembly, the strip 30 is bonded to the other segment, before the in-situ casting of the interlocking member 15.

In addition to reinforcing the strength and integrity of the pipe section, the strip has the additional function of assisting containing the compound in the grooves 14 during the injection thereof. This function may be enhanced if a corresponding strip is fitted to the internal surfaces of the segments, as well (not shown).

The invention claimed is:

1. A pipe construction system comprising:
a plurality of pipe sections, wherein each said pipe section is assembled from a plurality of pipe segments and has a socket formed at one end of the pipe section and a spigot formed at another end of the pipe section, such that the socket of one pipe section receives the spigot of another pipe section to provide a length of pipe;
wherein each said pipe segment has a socket-forming end, a spigot-forming end, and two edges parallel to the length of the pipe section; wherein each edge includes a region of increased radial thickness radially extending beyond the radial thickness of a major part of the pipe segment and wherein each edge has a groove opened only at said edge and disposed within the radial thickness of the entire pipe segment at said region of increased radial thickness, said region of increased radial thickness extending through the socket-forming end and up to the spigot-forming end of the pipe segment, and
wherein the spigot-forming end of the pipe segment has a radial thickness equated with said radial thickness of said major part of the pipe segment and has a pocket formed therein within the radial thickness of the major part of the pipe segment, such that each pocket mates with a corresponding pocket of an adjacent pipe segment, wherein a sealant is disposed in the mated pockets.

2. A pipe construction system as claimed in claim 1, wherein each said groove is of re-entrant form, whereby an interlocking member is cast in-situ in the aligned grooves of adjacent pipe segments, mechanically to hold those edges together.

3. The pipe construction system as claimed in claim 2, wherein each groove is of dovetail form, in cross-section.

4. The pipe construction system as claimed in claim 1, wherein the region of increased radial thickness and defining said groove comprises a pre-formed component bonded to the material of the major part of the segment during the manufacture thereof.

5. The pipe construction system as claimed in claim 4, wherein the major part of each segment comprises a fibre-reinforced plastics material moulding.

6. The pipe construction system as claimed in claim 4, wherein the major part of each segment comprises inner and outer skins of a fibre-reinforced plastics material between which is disposed a resin-impregnated filler.

7. The pipe construction system as claimed in claim 1, wherein a reinforcing strip extends along and projects from the longitudinal edge region of one pipe segment, for bonding to the corresponding edge region of an adjacent pipe segment.

8. A method of constructing a pipe comprising:
assembling a pipe section from a plurality of pipe segments, the pipe section having a socket formed at one end of the pipe section and a spigot formed at another end of the pipe section, and each pipe segment having a socket-forming end, a spigot-forming end, and two edges parallel to the length of the pipe section; wherein each edge includes a region of increased radial thickness radially extending beyond the radial thickness of a major part of the pipe segment and wherein each edge has a groove opened only at said edge and disposed within the radial thickness of the entire pipe segment at said region of increased radial thickness, the region of increased radial thickness extending through the socket-forming end and up to the spigot-forming end of the pipe segment, and wherein the spigot-forming end of the pipe segment has a radial thickness equated with the radial thickness of the major part of the pipe segment and has a pocket formed therein within the radial thickness of the major part of the pipe segment;
wherein the step of assembling a pipe section includes the steps of
mating the pockets of adjacent pipe segments;
injecting a sealant into the pockets at the spigot end of the pipe section;
aligning the grooves along the edges of adjacent pipe segments; and
injecting a sealant into each pair of aligned grooves and allowing the sealant to cure, thereby providing a bonding interlocking member;
assembling additional pipe sections in a like manner; and
continuously interengaging the spigot end of a pipe section into the socket end of another pipe section to provide a desired length of pipe;
wherein the step of continuously interengaging includes at least one of the steps of
disposing a sealant internally around the socket of a pipe section to receive the spigot of an another pipe section; and
disposing a sealant externally around the spigot of a pipe section to be received by the socket of another pipe section.

9. The method as claimed in claim 8, wherein the step of injecting a sealant into the aligned grooves includes the step of drawing a vacuum through the grooves from one end of the pipe section while injecting the sealant into the grooves from the other end of the section.

10. The method as claimed in claim 9, wherein the step of assembling further includes permitting the sealant to flow between the interfacing edges of the respective pipe segments.

11. The method as claimed in claim 8, wherein the pockets open into the radial end face of the pipe section, and wherein the step of injecting the sealant into the pockets including injecting a sealing agent into those pockets from said end face.

12. The method as claimed in claim 8, wherein said sealant comprises a non-setting mastic.

13. The method as claimed in claim 8, wherein said sealant comprises a sealing gasket fitted either around the spigot or internally within the socket.

14. The method as claimed in claim 8, further comprising the step of securing a reinforcing strip to at least one of the internal and external adjacent edge regions of two segments to bridge the longitudinal joint.

15. The method of constructing a pipe as claimed in claim 8, further comprising:
   lining an existing closed duct by effecting within the existing duct the method of constructing a pipe as claimed in claim 8 so as to build-up the pipe in situ in the duct but with a clearance between an outer wall of the pipe and an inner wall of the duct, and then filling said clearance with a grouting material.

16. A method of constructing a pipe comprising:
   assembling a pipe section from a plurality of pipe segments, the pipe section having a socket formed at one end of the pipe section and a spigot formed at another end of the pipe section, and each pipe segment having a socket-forming end, a spigot-forming end, and two edges parallel to the length of the pipe section; wherein each edge includes a region of increased radial thickness radially extending beyond the radial thickness of a major part of the pipe segment and wherein each edge has a groove opened only at said edge and disposed within the radial thickness of the entire pipe segment at said region of increased radial thickness, the region of increased radial thickness extending through the socket-forming end and up to the spigot-forming end of the pipe segment, and wherein the spigot-forming end of the pipe segment has a radial thickness equated with the radial thickness of the major part of the pipe segment and has a pocket formed therein within the radial thickness of the major part of the pipe segment;
   wherein the step of assembling a pipe section includes the steps of
   mating the pockets of adjacent pipe segments;
   injecting a sealant into the pockets at the spigot end of the pipe section;
   aligning the grooves along the edges of adjacent pipe segments; and
   injecting a sealant into each pair of aligned grooves and allowing the sealant to cure, thereby providing a bonding interlocking member;
   selectively disposing a sealant either internally around the socket of the pipe section or externally around the spigot of the pipe section; and
   selectively fitting either the spigot-forming ends of a plurality of other pipe segments into the socket of the assembled pipe section or the socket-forming ends of a plurality of other pipe segments around the spigot end of a pipe section, while mating the pockets of adjacent pipe segments and aligning the grooves along the edges of adjacent pipe segments, to form a further pipe section coupled to the assembled pipe section;
   injecting a sealant into the pockets at the spigot end of the further pipe section; and
   injecting a sealant into each pair of aligned grooves of the further pipe section and allowing the sealant to cure.

17. The method as claimed in claim 16, wherein the step of injecting the sealant into the grooves of each further pipe section includes forming an opening into the grooves from internally within the further pipe section adjacent the previously-assembled pipe section, and then drawing a vacuum from the grooves through said opening while injecting the sealant into the grooves from the other end of the pipe section.

18. The method as claimed in claim 17, wherein said sealant is permitted to flow between the interfacing edges of the respective segments.

19. The method as claimed in claim 16, wherein the step of injecting the sealant into the grooves of each further pipe section includes forming an opening into the grooves from internally within the further pipe section adjacent the previously-assembled pipe section, and then drawing a vacuum from the grooves from the other end of the pipe section while injecting the sealant into the grooves through said opening.

20. The method as claimed in claim 16, wherein a further opening is formed from internally within the further pipe section into the pockets and a sealing agent is injected into those pockets through said further opening.

21. The method as claimed in claim 20, wherein said sealing agent comprises a non-setting mastic.

22. The method as claimed in claim 16, wherein a reinforcing strip is secured to at least one of the internal and external adjacent edge regions of two segments to bridge the longitudinal joint.

23. The method of constructing a pipe as claimed in claim 16, further comprising
   lining an existing closed duct comprising by effecting within the existing duct the method of constructing a pipe as claimed in claim 16 so as to build-up the pipe in situ in the duct but with a clearance between an outer wall of the pipe and an inner wall of the duct, and then filling said clearance with a grouting material.

* * * * *